United States Patent
Long et al.

(10) Patent No.: US 7,191,532 B2
(45) Date of Patent: Mar. 20, 2007

(54) MODULAR TOOL ASSEMBLY HAVING A VACUUM MOUNTING ARRANGEMENT

(75) Inventors: Charles Keith Long, Seneca, SC (US); Kevin A. Moore, Anderson, SC (US); Charles M. Wacker, Chandler, AZ (US); Skye V. Taylor, Anderson, SC (US)

(73) Assignee: Eastway Fair Company Limited, Tortola (VG)

( * ) Notice: Subject to any disclaimer, the term of this patent is extended or adjusted under 35 U.S.C. 154(b) by 0 days.

(21) Appl. No.: 10/977,503

(22) Filed: Oct. 29, 2004

(65) Prior Publication Data

US 2006/0037203 A1 Feb. 23, 2006

Related U.S. Application Data

(63) Continuation-in-part of application No. 10/919,569, filed on Aug. 17, 2004, now abandoned.

(51) Int. Cl.
*G01C 15/00* (2006.01)

(52) U.S. Cl. ............................................ 33/286; 33/291

(58) Field of Classification Search .................. 33/283, 33/286, 370–371, 347, DIG. 2, 290–291, 33/DIG. 21
See application file for complete search history.

(56) References Cited

U.S. PATENT DOCUMENTS

| 2,600,857 | A | 6/1952 | De La Mater |
|---|---|---|---|
| 2,615,426 | A | 10/1952 | Fryer |
| 2,711,030 | A | 6/1955 | Drew et al. |
| 2,992,487 | A | 7/1961 | Miller |
| 3,489,324 | A | 1/1970 | Stohl |
| 3,675,886 | A | 7/1972 | Kampmier |
| 3,724,953 | A | 4/1973 | Johnston, Jr. |
| 3,897,637 | A | 8/1975 | Genho |
| 4,063,365 | A | 12/1977 | Hopkins et al. |
| 4,225,106 | A | 9/1980 | Eplan |
| 4,703,563 | A | 11/1987 | Hoshino et al. |
| 4,852,265 | A | 8/1989 | Rando et al. |
| 4,853,617 | A | 8/1989 | Douglas et al. |
| 4,907,769 | A | * 3/1990 | Hunley et al. ........... 248/185.1 |
| 4,912,851 | A | 4/1990 | Rando et al. |
| 4,924,597 | A | 5/1990 | Tursi |
| 4,992,741 | A | 2/1991 | Douglas et al. |
| 5,063,679 | A | * 11/1991 | Schwandt .................... 33/347 |
| 5,075,977 | A | 12/1991 | Rando |

(Continued)

FOREIGN PATENT DOCUMENTS

EP        0 977 007 A1      2/2000

(Continued)

*Primary Examiner*—Yaritza Guadalupe-McCall
(74) *Attorney, Agent, or Firm*—Brinks Hofer Gilson & Lione; G. Peter Nichols

(57) ABSTRACT

A modular tool assembly including a tool base configured to releasably secure a modular tool arrangement in a fixed relationship relative to a mounting surface. The tool base includes an upper housing portion and a lower housing portion having a mounting seal extending therefrom. The mounting seal cooperates with the mounting surface to define a vacuum pocket therebetween. A vacuum generating mechanism is configured to remove air from the vacuum pocket through an aperture in the lower housing portion. A modular tool attachment releasably engages a portion of the tool base to secure the modular tool attachment to the tool base.

21 Claims, 5 Drawing Sheets

U.S. PATENT DOCUMENTS

| | | |
|---|---|---|
| 5,144,487 A | 9/1992 | Hersey |
| 5,182,863 A | 2/1993 | Rando |
| 5,218,770 A | 6/1993 | Toga |
| 5,253,421 A | 10/1993 | Landmark |
| 5,287,627 A | 2/1994 | Rando |
| 5,352,974 A | 10/1994 | Heger |
| 5,366,129 A | 11/1994 | Nakamura et al. |
| 5,394,616 A | 3/1995 | Claxton |
| 5,400,514 A | 3/1995 | Imbrie et al. |
| 5,459,932 A | 10/1995 | Rando et al. |
| 5,519,942 A | 5/1996 | Webb |
| 5,524,352 A | 6/1996 | Rando et al. |
| 5,531,031 A | 7/1996 | Green |
| 5,541,727 A | 7/1996 | Rando et al. |
| 5,552,886 A | 9/1996 | Kitajima et al. |
| 5,584,458 A | 12/1996 | Rando |
| 5,594,993 A | 1/1997 | Tager et al. |
| 5,610,711 A | 3/1997 | Rando |
| 5,617,202 A | 4/1997 | Rando |
| 5,617,645 A | 4/1997 | Wick et al. |
| 5,619,128 A | 4/1997 | Heger |
| 5,619,802 A | 4/1997 | Rando et al. |
| 5,621,975 A | 4/1997 | Rando |
| 5,630,517 A | 5/1997 | Maznik |
| 5,655,307 A | 8/1997 | Ogawa et al. |
| 5,713,135 A | 2/1998 | Acopulos |
| 5,748,306 A | 5/1998 | Louis |
| 5,773,721 A | 6/1998 | Bashyam |
| 5,795,001 A | 8/1998 | Burke |
| 5,819,424 A | 10/1998 | Ohtomo et al. |
| 5,829,152 A | 11/1998 | Potter et al. |
| 5,842,282 A | 12/1998 | Ting |
| 5,859,693 A | 1/1999 | Dunne et al. |
| 5,864,956 A | 2/1999 | Dong |
| 5,872,657 A | 2/1999 | Rando |
| 5,894,675 A | 4/1999 | Cericola |
| 5,900,931 A | 5/1999 | Rando |
| 5,905,455 A | 5/1999 | Heger et al. |
| 5,917,314 A | 6/1999 | Heger et al. |
| 5,917,587 A | 6/1999 | Rando |
| D412,674 S | 8/1999 | Kaiser |
| D412,857 S | 8/1999 | Howard et al. |
| 5,949,529 A | 9/1999 | Dunne et al. |
| 5,956,861 A | 9/1999 | Barnes |
| D415,436 S | 10/1999 | Martone |
| 5,999,346 A | 12/1999 | Grundstrom et al. |
| 6,005,719 A | 12/1999 | Rando |
| D418,432 S | 1/2000 | Krantz |
| D418,434 S | 1/2000 | Krantz |
| D418,763 S | 1/2000 | Krantz |
| D419,149 S | 1/2000 | Krantz et al. |
| D419,544 S | 1/2000 | Krantz |
| D419,545 S | 1/2000 | Krantz et al. |
| D419,546 S | 1/2000 | Krantz et al. |
| 6,009,630 A | 1/2000 | Rando |
| 6,012,229 A | 1/2000 | Shiao |
| D420,972 S | 2/2000 | Brecher et al. |
| 6,023,159 A | 2/2000 | Heger |
| 6,030,091 A | 2/2000 | Li |
| 6,037,874 A | 3/2000 | Heironimus |
| 6,065,217 A | 5/2000 | Dong |
| 6,067,152 A | 5/2000 | Rando |
| D427,166 S | 6/2000 | Krantz |
| 6,073,353 A | 6/2000 | Ohtomo et al. |
| 6,137,564 A | 10/2000 | Schmidt et al. |
| 6,157,591 A | 12/2000 | Krantz |
| 6,163,969 A | 12/2000 | Jan et al. |
| 6,178,655 B1 | 1/2001 | Potter et al. |
| 6,198,271 B1 | 3/2001 | Heger et al. |
| 6,202,312 B1 | 3/2001 | Rando |
| 6,209,219 B1 | 4/2001 | Wakefield et al. |
| 6,211,662 B1 | 4/2001 | Bijawat et al. |
| 6,215,293 B1 | 4/2001 | Yim |
| 6,219,931 B1 * | 4/2001 | Roth ................... 33/645 |
| 6,223,446 B1 | 5/2001 | Potter |
| 6,249,113 B1 | 6/2001 | Krantz et al. |
| 6,259,241 B1 | 7/2001 | Krantz |
| 6,262,801 B1 | 7/2001 | Shibuya et al. |
| 6,301,997 B1 | 10/2001 | Welte |
| 6,351,890 B1 | 3/2002 | Williams |
| 6,360,446 B1 | 3/2002 | Bijawat et al. |
| D455,430 S | 4/2002 | Krantz |
| D455,750 S | 4/2002 | Krantz |
| 6,382,574 B1 | 5/2002 | Pando |
| D461,135 S | 8/2002 | Watson et al. |
| 6,427,347 B1 | 8/2002 | Butler, Sr. |
| D464,578 S | 10/2002 | Zurwelle |
| 6,493,952 B1 | 12/2002 | Kousek et al. |
| D469,556 S | 1/2003 | Malard et al. |
| 6,502,319 B1 | 1/2003 | Goodrich et al. |
| D470,423 S | 2/2003 | Loudenslager et al. |
| 6,532,675 B2 | 3/2003 | Letourneau |
| 6,532,676 B2 | 3/2003 | Cunningham |
| D474,985 S | 5/2003 | Cooper et al. |
| D475,938 S | 6/2003 | Lopano |
| 6,577,388 B2 | 6/2003 | Kallabis |
| 6,581,296 B2 | 6/2003 | Ponce |
| D476,584 S | 7/2003 | Zurwelle |
| 6,593,754 B1 | 7/2003 | Steber et al. |
| 6,594,910 B2 | 7/2003 | Wishart |
| 6,606,798 B2 | 8/2003 | El-Katcha et al. |
| 6,612,714 B1 * | 9/2003 | Morre et al. ................ 362/191 |
| 6,625,895 B2 | 9/2003 | Tacklind et al. |
| 6,640,456 B2 | 11/2003 | Owoc et al. |
| 6,674,276 B2 | 1/2004 | Morgan et al. |
| 6,880,256 B2 | 4/2005 | Helms |
| 6,964,545 B1 * | 11/2005 | Languasco ................ 408/16 |
| 2001/0007420 A1 | 7/2001 | Bijawat et al. |
| 2001/0029675 A1 | 10/2001 | Webb |
| 2001/0034944 A1 | 11/2001 | Cunningham |
| 2001/0049879 A1 | 12/2001 | Moore |
| 2001/0053313 A1 | 12/2001 | Luebke |
| 2002/0017028 A1 | 2/2002 | Wishart |
| 2002/0059735 A1 | 5/2002 | Ponce |
| 2002/0069543 A1 | 6/2002 | Owoc et al. |
| 2002/0073561 A1 | 6/2002 | Liao |
| 2002/0152621 A1 | 10/2002 | Letourneau |
| 2002/0162233 A1 | 11/2002 | El-Katcha et al. |
| 2002/0166249 A1 | 11/2002 | Liao |
| 2002/0178596 A1 | 12/2002 | Malard et al. |
| 2002/0193964 A1 | 12/2002 | Hsu |
| 2003/0061720 A1 | 4/2003 | Waibel |
| 2003/0101605 A1 | 6/2003 | Tacklind et al. |
| 2003/0131491 A1 | 7/2003 | Weeks |
| 2003/0201783 A1 | 10/2003 | Steber et al. |
| 2003/0218469 A1 | 11/2003 | Brazell et al. |
| 2003/0231303 A1 | 12/2003 | Raskin et al. |
| 2004/0000918 A1 | 1/2004 | Sanoner et al. |
| 2004/0004825 A1 | 1/2004 | Malard et al. |
| 2004/0031163 A1 | 2/2004 | El-Katcha et al. |
| 2004/0205972 A2 * | 10/2004 | Wu ................... 33/286 |
| 2005/0022399 A1 | 2/2005 | Wheeler et al. |
| 2005/0066533 A1 * | 3/2005 | Wheeler et al. ........... 33/286 |
| 2005/0155238 A1 * | 7/2005 | Levine et al. ............ 33/286 |
| 2005/0198845 A1 * | 9/2005 | Robinson ............. 33/227 |
| 2005/0206891 A1 * | 9/2005 | Khubani ............... 33/286 |
| 2006/0016083 A1 | 1/2006 | Huang |
| 2006/0037203 A1 | 2/2006 | Long et al. |

FOREIGN PATENT DOCUMENTS

| | | |
|---|---|---|
| EP | 0 981 037 A1 | 2/2000 |
| EP | 1 235 051 A2 | 8/2003 |
| EP | 1 357 353 A2 | 10/2003 |

| EP | 1 367 364 A2 | 12/2003 |
| EP | 1 367 365 A2 | 12/2003 |
| EP | 1 367 366 A2 | 12/2003 |
| EP | 1 376 054 A1 | 2/2004 |
| GB | 2 383 138 A | 6/2003 |
| GB | 2 389 194 A | 12/2003 |
| GB | 2 390 498 A | 1/2004 |

* cited by examiner

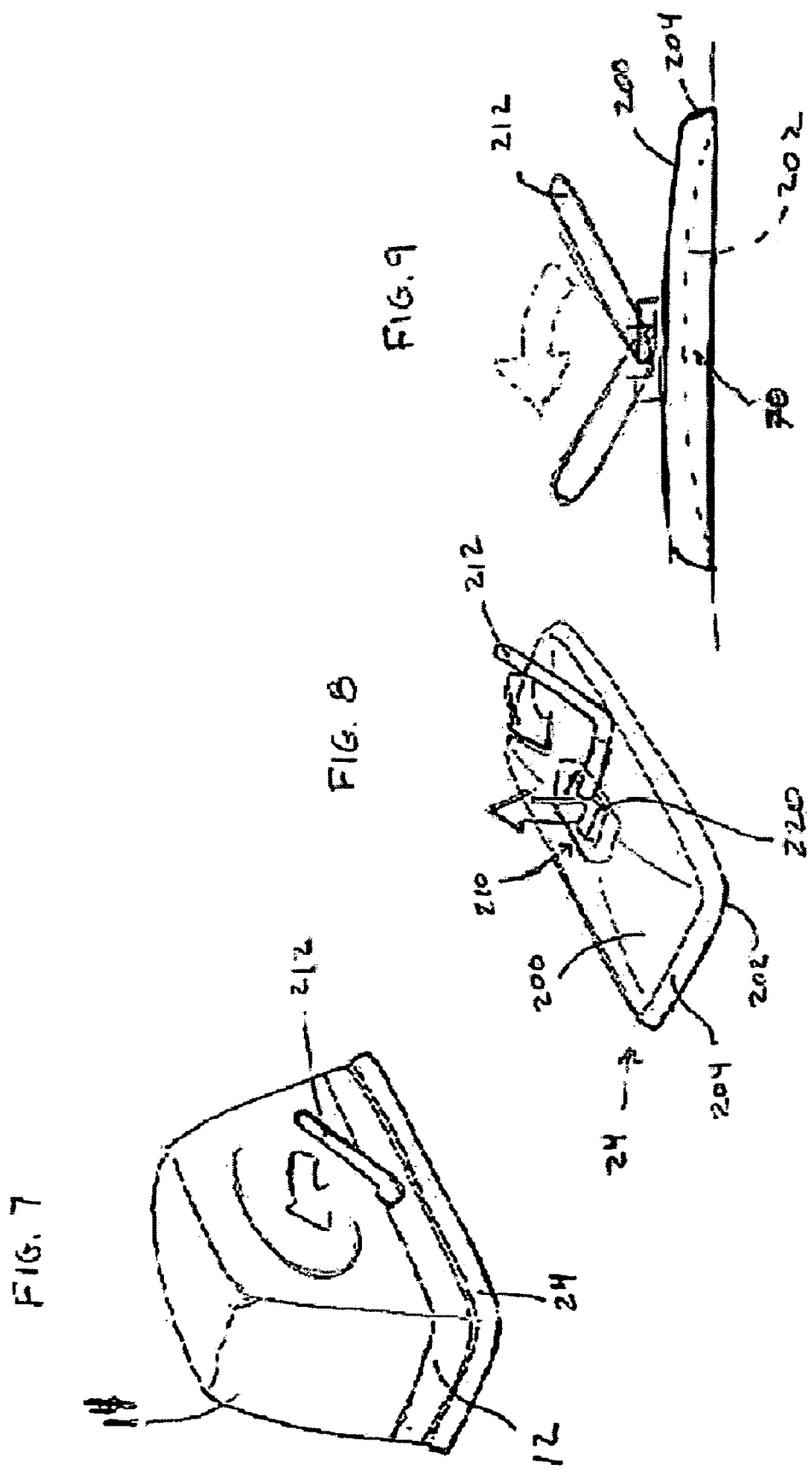

MODULAR TOOL ASSEMBLY HAVING A VACUUM MOUNTING ARRANGEMENT

This application is a continuation-in-part of U.S. Ser. No. 10/919,569 filed Aug. 17, 2004 now abandoned, the entire contents of which is incorporated herein by reference.

BACKGROUND

This invention relates to a modular tool assembly having a base incorporating a vacuum mounting arrangement for securing the modular tool assembly to a mounting surface.

Suction mounting devices are frequently coupled to tools utilized for transporting materials between locations or attaching devices to surfaces. Battery powered suction devices are typically used in the construction and assembly industries. For example, auto workers frequently use handled suction devices to manipulate panes of automotive glass between assembly locations.

Recently, power tool manufacturers have developed common battery arrangements that support a variety of power tools sold in a combination package. Such kits may include tools such as drills, saws, and flashlights. Manufacturers are interested in adding laser alignment products, such as laser levels to these kits. Laser levels have replaced chalk lines and torpedo levels as the preferred tool for creating and displaying a level line on a surface. These tools are commonly used for interior decorating projects, such as hanging pictures and installing cabinetry, and exterior projects, such as brick laying and deck assembly.

Laser levels are easy to set up and generate an alignment beam which does not mark up the mounting surface. Current laser level products are either mounted to an adjustable frame or are secured to a mounting surface with a fastener. Laser levels typically include a laser light source mounted within a housing. The laser light source may be rotatably mounted within the housing to allow for either horizontal or vertical transmission of the beam.

One limitation of current laser alignment devices is that the laser levels cannot be easily repositioned on surfaces once mounted. Many laser level devices either incorporate a pin or a fastener to mount the level on a vertical surface to generate the alignment line. If the laser level is not properly aligned on the wall, a user will have to remove the device and remount in the proper position, placing additional marks and holes on the surface which must be patched.

It is desirable to provide a modular tool assembly having a base incorporating a vacuum mounting arrangement that is configurable to support a variety of tools, including hooks, clamps, light sources, battery powered tools, laser leveling devices and similar devices. It is also desirable to provide a modular tool assembly having a vacuum mounting arrangement that can be easily mounted to a mounting surface without damaging the finish of the surface. It is further desirable to provide a monitor to monitor the vacuum seal to ensure proper securement of the assembly to the mounting surface.

BRIEF SUMMARY

Accordingly, the present invention provides a modular tool assembly having a vacuum mounting arrangement for securing the assembly to a mounting surface. The modular tool assembly includes a base having upper and lower housing portions. A mounting seal extending from a lower portion of the housing cooperates with the mounting surface to define a suction mounting area therebetween. An upper housing portion may include a guide member having one or more receiving portions formed therein. Alternatively, the housing portion may be provided with a mounting element to mate with a complementary mounting element of a modular tool attachment.

A vacuum generating mechanism is disposed within the upper housing portion. In one embodiment, the vacuum generating mechanism is electrically connected to a power source (which may include a rechargeable power source). In this embodiment, the vacuum generating mechanism includes a motor and a pump operatively driven by the motor and configured to remove air from the suction mounting area. In one aspect, the air may be removed through an aperture in the lower portion of the tool base to secure the housing to the mounting surface. A sensor may be mounted proximate an aperture in the lower housing portion of the tool base. The sensor monitors the suction mounting area and activates the pump if the sensor detects a loss of pressure in the suction mounting area.

A switch that may be disposed on the upper portion of the tool base housing or elsewhere is operatively connected to the vacuum generating mechanism allows a user to activate the vacuum generating mechanism. At least one electrical connector may be provided in, for example, a top surface of the upper portion of the tool base housing to electrically connect the power source to a modular tool attachment.

A modular tool is releasably secured to a portion of the housing of the tool base. The modular tool may include a modular tool attachment that can be mounted on the base in a fixed relationship relative to the mounting surface. The modular tool attachment may include one or more projections extending from a tool attachment housing that releasably engages one or more receiving portions in a portion of the tool base. Alternatively, the tool attachment housing may have a complementary mounting element that cooperates with a mounting element provided on the housing to releasably secure the tool attachment housing to the base.

In one aspect of the present invention, the vacuum generating mechanism includes a manually operable pump cooperating with the suction mounting area to remove air from the suction mounting area. In one aspect, the air may be removed through an aperture in the housing to secure the base to the mounting surface. In an alternative embodiment the vacuum generating mechanism includes a lever to actuate a vacuum pad and create an air pocket or suction between the device and the surface on which the device is mounted.

In another aspect of the invention, the modular tool comprises a laser leveling device having a housing, a laser light source disposed within the housing operatively connected to a power source, the laser light source including at least one diode projecting an alignment beam through an aperture in the housing to denote a reference plane along the mounting surface. One or more bubble levels may be provided on the laser level housing. The modular tool may also comprise a flashlight, a clamp, a tape measure or other measuring device, a tool holder (such as a driver bit holder), an alignment device, a hook, powered (including battery powered) and non-powered tools.

BRIEF DESCRIPTION OF THE DRAWINGS

FIG. 7 is a perspective view of one embodiment of a modular tool assembly having a manually operable vacuum attachment.

FIG. 8 is a perspective view of the manually operable vacuum attachment for use with the assembly of FIG. 7 and with the modular tool assembly and the base removed.

FIG. 9 is a side perspective view of the manually operable vacuum attachment for use with the assembly of FIG. 7, with the modular tool assembly removed, and schematically showing operation of the lever and the vacuum pad.

DESCRIPTION

Figure 1:
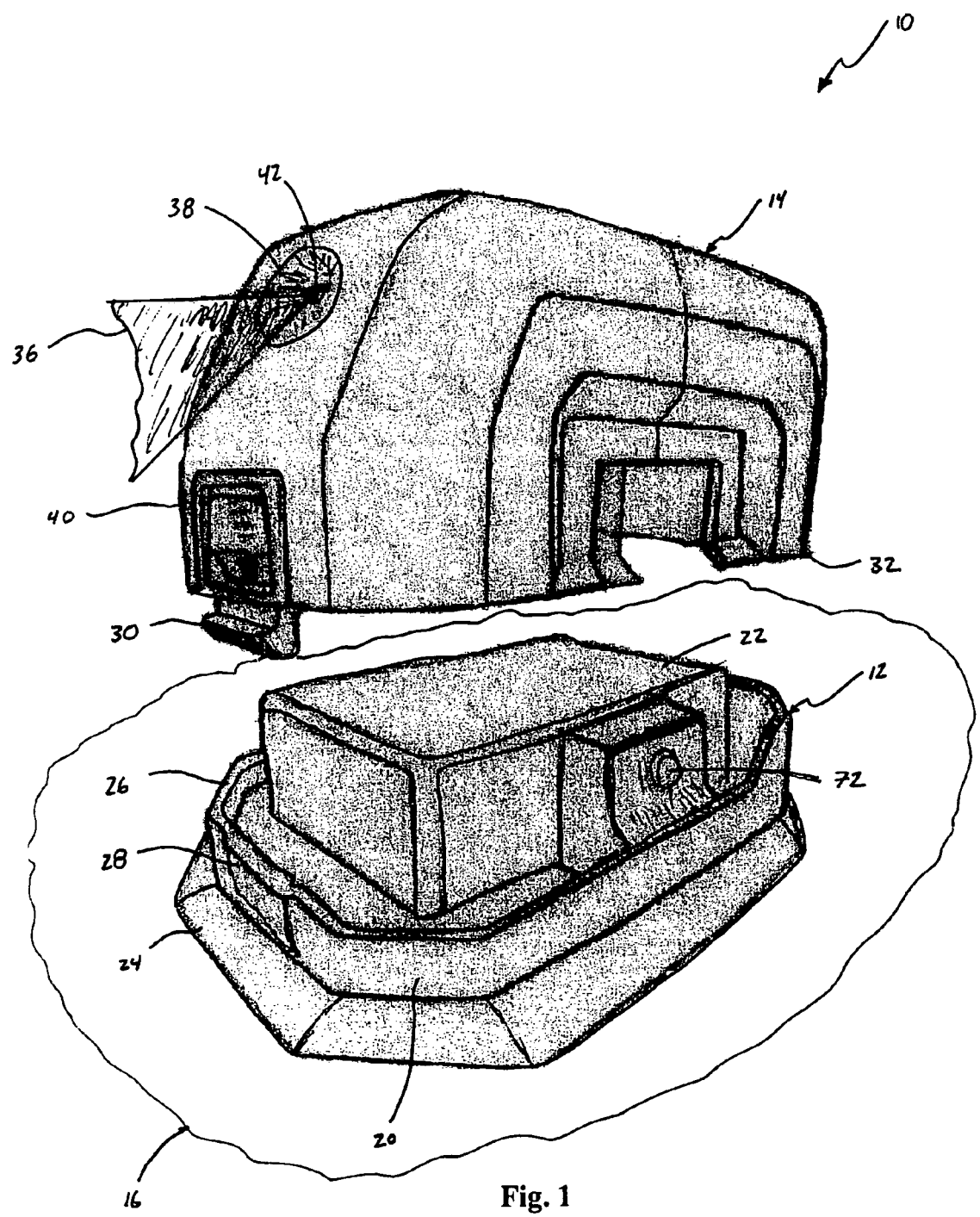
FIG. 1 is an exploded perspective view of the modular tool assembly having a modular tool attachment releasably secured to a tool base in accordance with the present invention.
Figure 2:
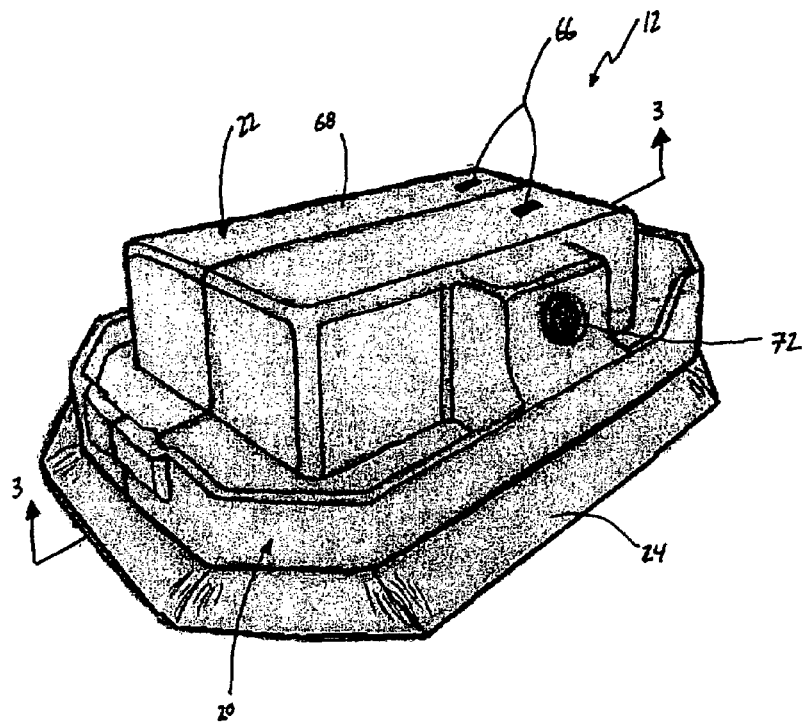
FIG. 2 is a perspective view of the tool base of the modular tool assembly in accordance with the present invention.

Referring now to FIGS. 1 and 2, a modular tool assembly 10 configurable to releasably secure a variety of portable tools, including powered and non-powered tools, is disclosed. Modular tool assembly 10 includes a tool base 12 incorporating a vacuum mounting arrangement for securing the tool base 12 and a removably mounted modular tool attachment 14 to a mounting surface 16. Tool base 12 includes a housing 18 having a lower portion 20 and an upper portion 22. A suction cup or mounting seal 24 extends from the lower housing portion 20.

A guide member 26 extends generally vertically from the lower housing portion 20 to provide an outer mounting guide for modular tool attachment 14. One or more receiving portions 28 are formed in the guide member 26 to receive and secure one or more connecting arms or projections 30 extending from the modular tool attachment 14. The guide member 26 cooperates with the tool housing 32 of the modular tool attachment 14 to position and secure the tool attachment 14 on the tool base 12.

Figure 4A:
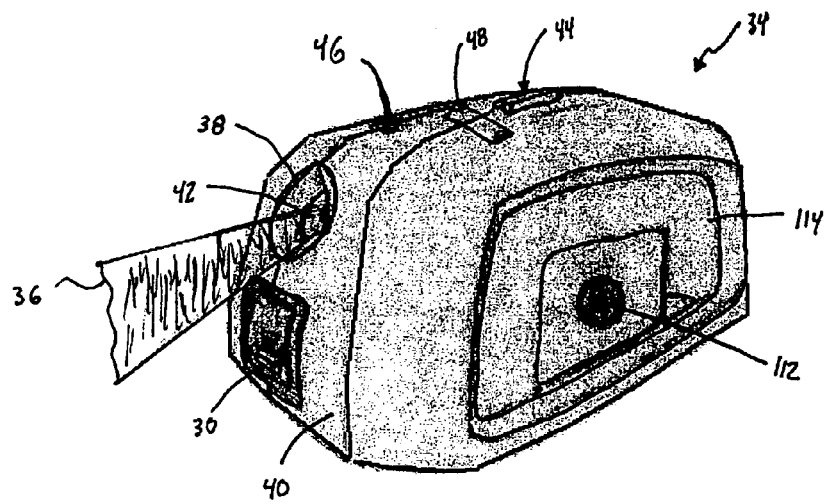
FIG. 4a is a perspective view of the laser leveling modular tool attachment configured for coupling to the modular tool assembly.

Referring now to FIGS. 1 and 4a, the modular tool attachment is a laser leveling device 34 adapted for attachment to the modular tool base 12. A laser light source (not shown) is mounted with the housing 32. The laser light source includes at least one diode (not shown) which projects one or more alignment beams 36 through an opening 38 in an end wall 40 of the housing 32. In one aspect of the present invention, a lens 42 is provided in the opening 38 to cooperate with at least one diode to focus the alignment beam 36. However, it is understood that the alignment beam 36 may project through a standard opening in the housing 32 to denote a reference plane along the mounting surface 16.

In one aspect of the present invention, the laser light source is rotatably mounted within the housing 32 to allow a user to adjust the position of the laser light source once the laser level attachment 34 is placed in a fixed relationship to the mounting surface 16 when mounted on the tool base 12. It is understood, however, that the laser light source may be fixedly mounted to a portion of the housing. It is also contemplated that laser level attachment may include a laser light source having a pair of diodes in a coplanar relationship which project alignment beams through openings in opposing end walls of the laser level housing. Further, the laser light source may include a first diode which projects a first alignment beam through a first opening in the end or side wall of the housing and a second diode projecting a second alignment beam generally perpendicular to the first alignment beam through a second opening in an end or side wall of the housing.

One or more bubble levels 44 can be provided such as along the top portion 46 of the laser leveling device housing 32. The bubble levels 44, 48 assist the operator in positioning the laser level attachment 34 mounted on the tool base 12 to the mounting surface 16 to ensure that the alignment beam 36 projects across the surface 16 at the desired angle. In one aspect of the invention shown in FIG. 4a, a pair of bubble levels 44, 48 are provided on the top portion 46 of the laser level housing 32 to provide both horizontal and vertical alignment information to the operator prior to securement of tool assembly 10 to mounting surface 16. It is understood that a single bubble level disposed on the laser level housing may also be used to display the alignment position of the modular tool assembly.

Figure 3:
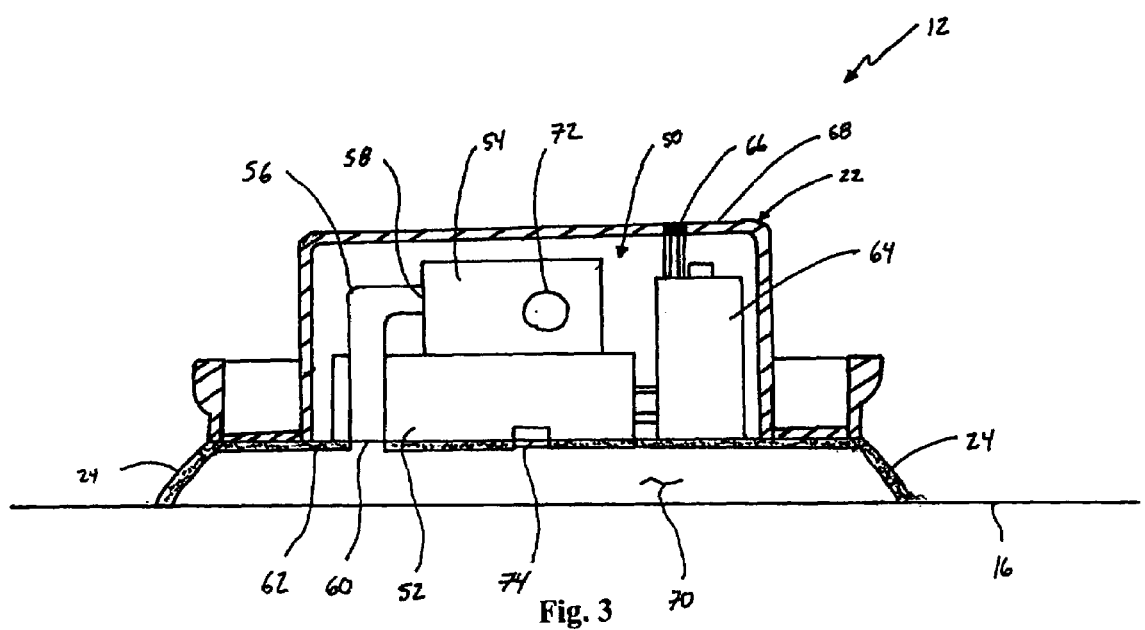
FIG. 3 is a cross-sectional view of the tool base along line 3—3 of FIG. 2.

Referring now to FIGS. 2 and 3, a vacuum generating mechanism 50 is disposed within the tool base 12 to create a suction effect to secure the tool base 12 to the mounting surface 16. In one embodiment, the vacuum generating mechanism 50 includes a motor 52 and a vacuum pump 54 operatively connected to the motor 52 disposed within the upper housing portion 22. It is understood that the motor 52 and the pump 54 may be formed as a single unit. A hose 56 connects an inlet 58 on the pump 54 to an aperture 60 in the bottom surface 62 of the lower housing portion 20. Air is drawn through the aperture 60 by the pump 54.

A power source 64 disposed within the upper housing portion 22 is electrically connected to the motor 52. The power source 64 may include a rechargeable battery pack, such as a lithium ion or nickel cadmium battery, or removable rechargeable or alkaline battery. In one aspect of the present invention, one or more electrical contacts 66 in electrical communication with the power source 64 extend through a top surface 68 of the upper housing portion 22 to supply power to the modular tool attachment 14. It is also contemplated that the modular tool attachment 14 may include an independent power source.

The motor 52 and the pump 54 of the vacuum generating mechanism 50 cooperate with the mounting seal 24 to create a vacuum pocket or suction mounting area 70 between the mounting surface 16, the mounting seal 24, and the bottom surface 62 of the lower housing portion 20 of the tool base 12.

The mounting seal 24 is preferably a rubber suction cup that cooperates with the mounting surface 16 to define a vacuum pocket 70 therebetween. In one aspect of the present invention, the bottom surface 62 of the lower housing portion 20 is arcuately shaped to form a cavity cooperating with the mounting seal 24 and the mounting surface 16 to enhance the suction effect created in the vacuum pocket 70. In this aspect, the modular tool attachment 14 and, in particular, the mounting seal 24, is placed into contact with a mounting surface 16 and pressed against the mounting surface to evaluate air from the vacuum pocket 70.

In another aspect of the present invention, air is removed from the vacuum pocket 70 by a pump. In one alternative, a switch 72 disposed on the upper housing portion 22 is operatively connected to the pump 54 to allow a user to activate the pump 54 to remove air from the vacuum pocket 70. The switch 72 may also control electrical contacts 66 supplying power to a device in the modular tool attachment 14, thereby controlling the activation of both the pump 54 of the vacuum generating mechanism 50 and the modular tool attachment 14. Alternatively, the modular tool attachment 14 may incorporate a switch that will independently operate the modular tool attachment.

Once the user places the mounting seal 24 of the tool base 12 in contact with a mounting surface 16, the user actuates the switch 72, which activates the pump 54. The pump 54 evacuates air from the vacuum pocket 70 through the inlet 60. A sensor 74 disposed in the bottom surface 62 of the lower housing portion 20 monitors the vacuum pocket 70. The sensor 74 activates the pump 54 to remove air from the vacuum pocket 70 if the sensor detects a loss of pressure in the vacuum pocket 70. Loss of vacuum pressure may be caused by imperfections in the mounting surface 16 or the seal 24 such as gaps or cracks that limit the effectiveness of the mounting seal 24. The sensor 74 allows the pump 54 to compensate for the surface flaws to ensure a proper seal between the tool base 12 and the mounting surface 16.

Figure 5:
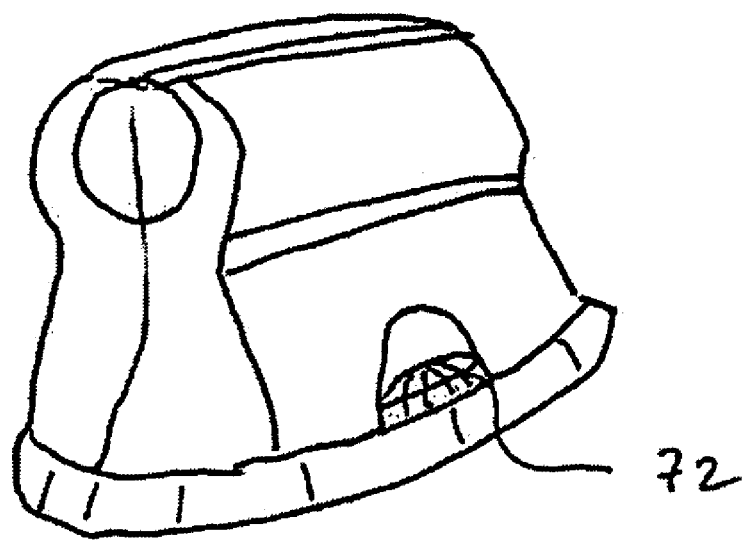
FIG. 5 is a perspective view of one embodiment of the modular tool assembly having a modular tool attachment wherein the modular tool assembly has a manually operable vacuum attachment.
Figure 6:
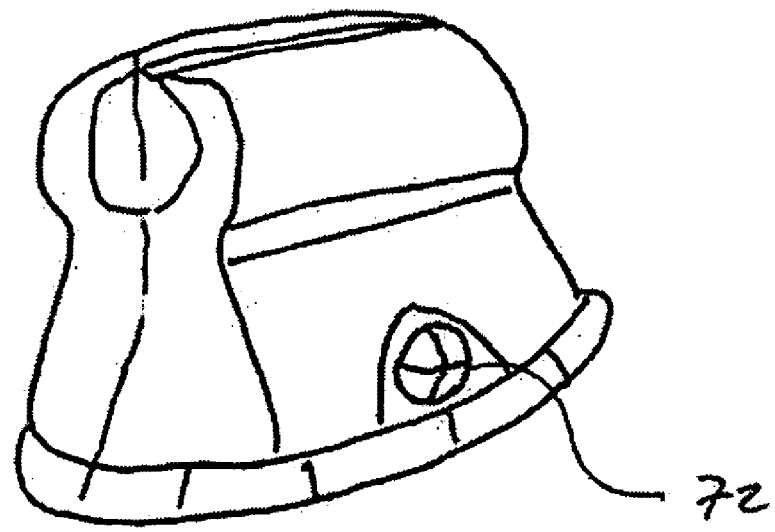
FIG. 6 is a perspective view of an embodiment similar to that shown in FIG. 5 except that the manual pump is shown in a different location.

A third aspect of the vacuum generating mechanism includes a manually operable pump cooperating with the mounting seal 24 to remove air from the vacuum pocket 70. A switch 72a may be placed on either the lower portion 20 or the upper portion 22 of the tool base as shown in FIGS. 5 and 6. The switch 72a may simply function to evacuate air from the vacuum pocket 70 when activated, such as by depressing the switch. Alternatively, the switch 72a may operate the pump such that when the switch 72a is depressed, air is evacuated from the vacuum pocket.

Figure 4B:
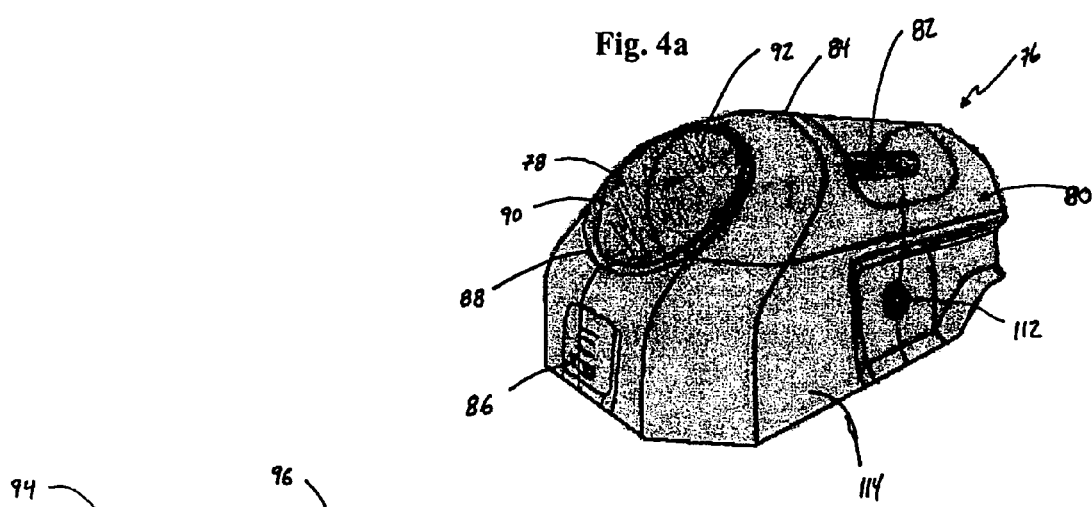
FIG. 4b is a perspective view of a flashlight modular tool attachment configured for coupling to the modular tool assembly.

Referring now to FIG. 4b, a second modular tool attachment is disclosed. In this instance, the modular tool attachment comprises a flashlight 76 having a flashlight head 78 and a flashlight body 80 configured for securement to the tool base 12. The flashlight body 80 includes a handle 82 formed in a top surface 84 of the body 80. One or more connecting arms 86 extend from the flashlight body 80 to releasably engage one or more receiving portions 28 in the guide member 26 of the tool base 12. Alternatively, the upper portion 22 such as the top surface 60 or elsewhere may be provided with a mounting element to engage a complementary mounting element on the flashlight body 80. For example, the mounting element may include a magnetic surface, a hook, or a complementary portion of a hook-and-loop type fastener, mating ribs, and other mounting elements well known in the art. The flashlight head 78 includes a shroud 88, a reflector 90 and a lens 92 mounted adjacent a bulb (not shown). The vacuum generating mechanism incorporated in the tool base 12 allows hands-free use of the flashlight 76 when mounted on a mounting surface 16.

Figure 4C:
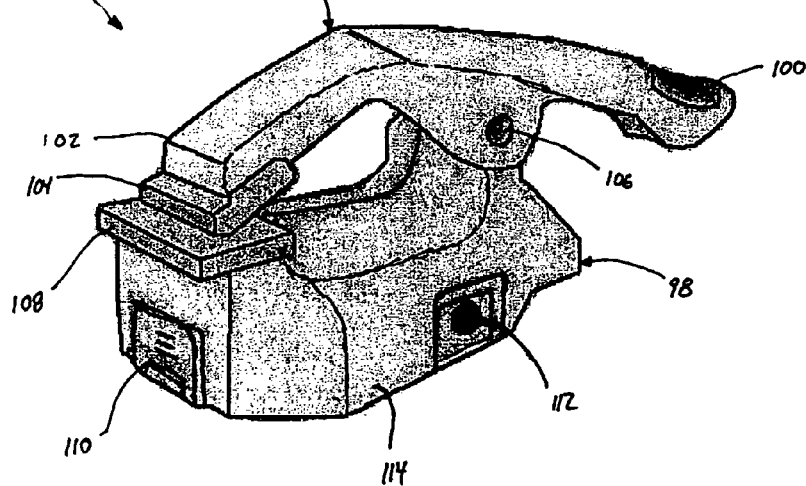
FIG. 4c is a perspective view of a clamp modular tool attachment configured for coupling to the modular tool assembly.

Referring now to FIG. 4c, a third modular tool attachment for the modular tool assembly of the present invention is disclosed. The third modular tool attachment comprises a clamp 94 having a handle 96 pivotally attached to a clamp housing 98. The handle 96 includes a distal end forming a handle portion 100 to be grasped by a user and an opposed gripping portion 102 including an elongate jaw 104 provided thereon. The handle 96 pivots about a spring biased mount 106 disposed in the clamp housing 98. The clamp housing 98 includes a generally horizontal jaw 108 cooperating with a jaw 104 on the handle 96 to secure a workpiece therebetween. The clamp housing 98 includes one or more projections 110 that releasably engage one or more receiving portions in guide member 26 of tool base 12. As with the flashlight 76, the clamp housing 98 may be mounted to the upper portion 22 by engagement with a mounting element provided on the upper portion 22.

Referring now to FIGS. 1 and 4a–4c, a switch 112 provided in a wall of 114 of the respective modular tool attachment embodiments may cooperate with a switch 72 on the modular tool base 12 to activate the pump 54 of vacuum generating mechanism 50 to mount the modular tool base 10 to the mounting surface 16. As described above, it is understood that the switch 72 may activate the laser light source of laser leveling device 34, the bulb of flashlight head 78 of flashlight 76, or to activate another modular tool attachment. Alternatively, the switch 112 may only activate the vacuum generating mechanism 50 while an independent switch operates the features of the modular tool attachments.

Referring now to FIGS. 7–9, another embodiment of the device of the present invention having a manual suction mounting arrangement is shown. In this embodiment, the base 12 having a mounting seal 16 is as described above with other alternative embodiments. The mounting seal 16 is provided with a top surface 200, a bottom surface 202 and a wall 204 extending from the top surface 200 to contact the attachment surface 16 and form a seal, as will be described below.

A lifting mechanism 210 provided on the top surface 200 of the mounting seal cooperates with the bottom surface 202 such that actuation of the lifting mechanism 210 lifts the bottom surface 202 to create a cavity 70. The lifting mechanism 210 can be provided with a lever 212 that extends from a portion of the tool base 12 such that movement of the lever 212 actuates the lifting mechanism 210. As shown in FIGS. 7–9, the lever 212 is rotated from a first position to a second position (counter clockwise direction) such that in the first position, there is no suction and in the second position there is a suction or vacuum when the cavity 70 is created.

Desirably, the lever 212 is fixed in either the first or the second position until manually moved to the other position. As shown in FIG. 8, the lifting mechanism 210 may include a cam 220 operatively connected to the bottom surface 202 such that rotation of the lever 212 causes the cam 220 and thus the bottom surface 202 to move toward the top surface 200 and thereby create a cavity 70.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A modular tool assembly comprising:
   a. a tool base including a vacuum mounting arrangement for securing the tool base to a mounting surface, the base comprising
   b. a housing having upper and lower housing portions,
   c. a mounting seal extending from the lower housing portion cooperating with the mounting surface to define a vacuum pocket therebetween,
   d. a vacuum generating mechanism disposed within the upper portion of the housing, the vacuum generating mechanism including a pump configured to remove air from the vacuum pocket to secure the housing to the mounting surface; and e. a modular tool including a battery powered tool and a non-powered tool, wherein one of the modular tools is selectively releasably secured to a portion of the housing of the tool base in a fixed relationship relative to the mounting surface.

2. The modular tool assembly of claim 1 wherein the modular tool further comprises one or more connecting arms extending from and releasably engaging one or more receiving portions formed in a guide member in the upper housing portion of the tool base to releasably secure the modular tool to the tool base.

3. The modular tool assembly of claim 1 further comprising a motor to drive the pump and a power source electrically connected to the motor.

4. The modular tool assembly of claim 3 further comprising a sensor that monitors the vacuum pocket and activates the pump if the sensor detects a loss of vacuum pressure in the vacuum pocket.

5. The modular tool assembly of claim 3 wherein at least one electrical connector is provided in a top surface of the upper housing portion of the tool base to electrically connect the power source to the modular tool attachment.

6. The modular tool assembly of claim 3 wherein the power source comprises a removably mounted battery.

7. The modular tool assembly of claim 3 wherein the power source comprises a rechargeable power source mounted within the housing.

8. The modular tool assembly of claim 1 further comprising a switch disposed on the upper housing portion of the tool base operatively connected to the vacuum generating mechanism allowing a user to activate the vacuum generating mechanism.

9. The modular tool assembly of claim 1 wherein the vacuum generating mechanism comprises a lever operatively cooperating with a portion of the mounting seal wherein the lever in a first position creates a cavity between the attachment surface and the portion of the mounting seal.

10. The modular tool assembly of claim 1 wherein a cavity is formed in a bottom surface of the lower housing portion of the tool base which cooperates with the mounting seal and mounting surface to create the vacuum pocket.

11. The modular tool assembly of claim 1 wherein the modular tool comprises a laser leveling device.

12. The modular tool assembly of claim 11 wherein the laser leveling device further comprises a housing, a laser light source disposed within the housing operatively connected to a power source, the laser light source including at least one diode projecting an alignment beam through an aperture in the housing to denote a reference plane along the mounting surface.

13. The modular tool assembly of claim 12 wherein the flashlight is electrically connected to the power source in the tool base.

14. The modular tool assembly of claim 11 wherein the laser leveling device further comprises one or more bubble levels provided on the laser level housing.

15. The modular tool assembly of claim 1 wherein the modular tool comprises a flashlight.

16. The modular tool assembly of claim 1 wherein the modular tool attachment comprises a pivotable clamp.

17. A tool base having a vacuum mounting arrangement configured to releasably secure a modular tool arrangement in a fixed relationship relative to a mounting surface, the modular tool base comprising:

a. a tool base housing having upper and lower housing portions, b. a mounting seal extending from the lower housing portion cooperating with the mounting surface to define a vacuum pocket therebetween, c. a power source disposed within the upper housing portion;

d. a vacuum generating mechanism electrically connected to the power source and disposed within the upper housing portion, the vacuum generating mechanism including a motor, a pump operatively driven by the motor configured to remove air from the vacuum pocket through an aperture in the lower housing portion to secure the tool base to the mounting surface and a sensor mounted proximate the aperture in the lower housing portion which monitors the vacuum pocket and activates the pump if the sensor detects a loss of vacuum pressure in the vacuum pocket.

18. The tool base of claim 17 wherein the upper housing portion includes a guide member having one or more receiving portions configured to receive one or more connecting arms extending from the modular tool attachment.

19. The tool base of claim 17 further comprising a switch operatively connected to the vacuum generating mechanism disposed on the upper housing portion of the tool base allowing a user to activate the vacuum generating mechanism.

20. The tool base of claim 17 wherein at least one electrical connector is provided in a top surface of the upper housing of the tool base to electrically connect the power source to the modular tool attachment.

21. A modular tool assembly comprising:

a. a tool base having a lower housing portion and an upper housing portion including a guide member having one or more receiving portions;

b. a mounting seal extending from the lower housing portion cooperating with the mounting surface to define a vacuum pocket therebetween;

c. a power source disposed within the upper housing portion;

d. a vacuum generating mechanism electrically connected to the power source and disposed within the upper housing portion, the vacuum generating mechanism including a motor, a pump operatively driven by the motor configured to remove air from the vacuum pocket through an aperture in the lower housing portion to secure the housing to the mounting surface and a sensor mounted proximate the aperture in the lower housing portion which monitors the vacuum pocket and activates the pump if the sensor detects a loss of vacuum pressure in the vacuum pocket;

e. a switch operatively connected to the vacuum generating mechanism disposed on the upper housing portion of the tool base allowing a user to activate the vacuum generating mechanism; and f. a modular tool including a battery powered tool and a non-powered tool, wherein each of the tools has one or more projections extending from and releasably engaging the one or more receiving portions formed in the upper housing portion of the tool base to selectively releasably secure one of the modular tools to the tool base.

* * * * *

UNITED STATES PATENT AND TRADEMARK OFFICE
CERTIFICATE OF CORRECTION

PATENT NO. : 7,191,532 B2  
APPLICATION NO. : 10/977503  
DATED : March 20, 2007  
INVENTOR(S) : Long et al.

Page 1 of 1

It is certified that error appears in the above-identified patent and that said Letters Patent is hereby corrected as shown below:

Title Page, Item (75) Inventor is corrected to read:
-- Charles Keith Long, Seneca (SC);
Kevin A. Moore, Anderson (SC);
Charles M. Wacker, Chandler (AZ);
Skye V. Taylor, Anderson (SC);
Lilia F. Macias, Anderson (SC) --.

Signed and Sealed this
Sixth Day of October, 2015

Michelle K. Lee
*Director of the United States Patent and Trademark Office*